No. 748,314. Patented December 29, 1903.

UNITED STATES PATENT OFFICE.

WILLIAM C. SALISBURY, OF DAKOTA, NEBRASKA, ASSIGNOR TO ANDREW J. KRAMPER, OF DAKOTA, NEBRASKA.

PROCESS OF MAKING SUGAR.

SPECIFICATION forming part of Letters Patent No. 748,314, dated December 29, 1903.

Application filed May 19, 1903. Serial No. 157,876. (No specimens.)

*To all whom it may concern:*

Be it known that I, WILLIAM C. SALISBURY, a citizen of the United States, residing at Dakota, in the county of Dakota and State of Nebraska, have invented new and useful Improvements in Processes of Manufacturing Syrup from Saccharin-Bearing Substances, of which the following is a specification.

This invention relates to a process of obtaining syrup from beet-cane, corn, root crops, or other substances containing saccharine matter.

The objects of the invention are in a ready, simple, thoroughly-feasible, and practical manner to eliminate the odor or flavor from the syrup inherent in the material producing it, to obviate fermentation and crystallization, to improve the taste and color of the produced product, and generally to simplify and cheapen the procedure.

With these and other objects in view, as will appear as the nature of the invention is better understood, the same consists in the process of obtaining syrup from saccharin-bearing substances and of defecating the same, as will be hereinafter fully described and claimed.

In carrying the invention into effect I take the material from which the syrup is to be obtained, which may be either beet-cane, corn, or any other saccharin-bearing substance, and place it in a suitable vessel, preferably one that is open, although a closed vessel may be employed, if preferred, and boil or cook the material either by a water-bath or by steam, preferably the latter. After the substance has been cooked to the proper degree it is removed and placed in a press of any well-known or preferred construction and the juice is expressed therefrom. I then take, say, one hundred gallons of juice and place it in a suitable vessel, preferably one that is open, and boil or cook it either by fire or steam for an hour, more or less, and at the beginning of this step I place in the juice a suitable defecating agent, preferably pulverized alum, and a precipitating agent, preferably bicarbonate of soda in the proportion of one ounce or more of the alum and one-half ounce or more of the soda to each one hundred gallons of the juice, and during this period of boiling or cooking the mass is thoroughly stirred and skimmed. The syrup is then allowed to cool slightly and to it is added any suitable flavoring extract—such as maple, vanilla, or the like—the mass during the addition of the flavoring extract being thoroughly stirred and skimmed. Should it be desired to impart body to the syrup, at the time the alum and soda are included sugar may be added to the mass in the proportion of one-fourth of a pound, more or less, to each gallon of the juice, the skimming being continued as requisite until the boiling procedure is finished, or, in other words, until the product has reached the desired consistency, whereupon it is allowed to cool.

By the employment of the alum any dregs or foreign substance in the syrup when the boiling-point is reached are separated and rise to the surface and are removed by skimming, as above described, the soda operating to precipitate the sulfate of alumina and to free the syrup from the taste and stringent effect of the alum, the alum and soda together operating to prevent fermentation.

While the addition of sugar to the syrup has been described, it is to be understood that the invention is not to be limited thereto, as if the syrup is of clear quality and not very base its use will not be required, the main object being to give body to the syrup. Furthermore, although the addition of a flavoring extract has been described, it will be obvious that this may be omitted in the production of the sugar or syrup and may be added subsequently, according to the taste of the user.

It will be obvious that in carrying the procedure into effect the steps herein set forth may be somewhat varied and the precise proportion of the ingredients may be changed and still be within the scope of the invention.

Having thus described the invention, what is claimed is—

1. The herein-described process of making syrup from saccharin-bearing substances, which consists in taking one hundred gallons of juice produced from such substances and, while boiling, adding thereto one ounce of pulverized alum, one-half ounce of bicarbonate of soda, and one-fourth pound of sugar to each gallon of the juice, then while boiling, stirring and skimming for about one hour, then permitting the syrup slightly to cool and then adding thereto one ounce of a suitable extract.

2. The herein-described process of making syrup from saccharin-bearing substances, which consists in taking one hundred gallons of juice produced from such substances, adding thereto while boiling one ounce of pulverized alum and one-half ounce of bicarbonate of soda, then while still boiling stirring and skimming for about one hour, then permitting the syrup slightly to cool and adding thereto one ounce of a suitable extract.

In testimony whereof I have hereunto set my hand in presence of two subscribing witnesses.

WILLIAM C. SALISBURY.

Witnesses:
W. H. RYAN,
R. E. EVANS.